(12) United States Patent
Nagaraja et al.

(10) Patent No.: US 12,384,530 B2
(45) Date of Patent: Aug. 12, 2025

(54) SELF-SUSTAINING SHIMMY DAMPER SYSTEM FOR LANDING GEAR SHOCK STRUT ASSEMBLIES

(71) Applicant: GOODRICH CORPORATION, Charlotte, NC (US)

(72) Inventors: Hemanth Nagaraja, Hassan (IN); Basavaraj Bodki, Bangalore (IN); Bhuwan Jain, Mississauga (CA)

(73) Assignee: GOODRICH CORPORATION, Charlotte, NC (US)

( * ) Notice: Subject to any disclaimer, the term of this patent is extended or adjusted under 35 U.S.C. 154(b) by 171 days.

(21) Appl. No.: 17/673,941

(22) Filed: Feb. 17, 2022

(65) Prior Publication Data

US 2023/0182892 A1   Jun. 15, 2023

(30) Foreign Application Priority Data

Dec. 14, 2021   (IN) .............................. 202141058202

(51) Int. Cl.
*F16F 9/53*    (2006.01)
*B64C 25/50*   (2006.01)
*B64C 25/60*   (2006.01)
*F16F 9/32*    (2006.01)

(52) U.S. Cl.
CPC ............ *B64C 25/505* (2013.01); *B64C 25/60* (2013.01); *F16F 9/3271* (2013.01); *F16F 9/535* (2013.01); *F16F 2226/04* (2013.01)

(58) Field of Classification Search
CPC .............................. F16F 9/3271; B64C 25/505
See application file for complete search history.

(56) References Cited

U.S. PATENT DOCUMENTS

| 8,292,218 | B2 | 10/2012 | Luce | |
| 2009/0224100 | A1* | 9/2009 | Luce | ..................... B64C 25/505 |
| | | | | 244/104 R |
| 2016/0207615 | A1* | 7/2016 | Narayan | ................. B64C 25/34 |
| 2018/0086440 | A1* | 3/2018 | Nguyen | ................ B64C 25/505 |

FOREIGN PATENT DOCUMENTS

| CN | 2575367 Y | * | 9/2003 | |
| CN | 108791827 A | * | 11/2018 | ............. B64C 25/50 |
| CN | 108930752 A | * | 12/2018 | |

(Continued)

OTHER PUBLICATIONS

European Patent Office, European Search Report dated May 19, 2023 in Application No. 22210937.3.

(Continued)

*Primary Examiner* — Melody M Burch
(74) *Attorney, Agent, or Firm* — SNELL & WILMER L.L.P.

(57) ABSTRACT

A shimmy damper assembly may comprise: a damper piston including a piston head, the piston head comprising a first permanent magnet, a shimmy cylinder including a second permanent magnet disposed on an axial surface of the shimmy cylinder, and a gland nut coupled to the shimmy cylinder, the gland nut including a third permanent magnet spaced apart axially from the second permanent magnet, the piston head disposed between the first permanent magnet and the second permanent magnet.

7 Claims, 4 Drawing Sheets

(56) References Cited

FOREIGN PATENT DOCUMENTS

| CN | 108980259 | | | 12/2018 | | |
|---|---|---|---|---|---|---|
| CN | 107021212 | | | 3/2019 | | |
| CN | 107021212 | B | * | 3/2019 | ............ | B64C 25/505 |
| CN | 110953285 | A | * | 4/2020 | ............ | F16F 9/3214 |
| CN | 111196353 | | | 5/2020 | | |
| CN | 111734773 | A | * | 10/2020 | | |
| DE | 102011113918 | | | 3/2013 | | |
| EP | 1255058 | A2 | * | 11/2002 | ............ | F16F 9/3405 |
| EP | 3882137 | | | 9/2021 | | |
| KR | 102023268 | B1 | * | 9/2019 | | |
| KR | 102038011 | | | 10/2019 | | |

OTHER PUBLICATIONS

Lord, "Magneto-Rheological (MR) Fluid." Parker Hannifin Corp 2020, https://www.lord.com/products-and-solutions/active-vibration-control/industrial-suspension-systems/magneto-rheological-mr-fluid, retrieved May 11, 2022, 3 pages.

Nedo, "Development of a Highly Stable Magnetorheological Fluid (MR Fluid) That Does Not Sediment Even After Long Storage", New Energy and Industrial Technology Development Organization, https://www.nedo.go.jp/english/news/AA5en_100424.html, Mar. 24, 2020, 3 pages.

Lord, "MR fluid (Magneto Rheological Fluid)", Video Link: https://www.lord.com/sites/default/files/MR%20Fluid%20Gif.gif, retrieved May 11, 2022, 4 pages.

* cited by examiner

SELF-SUSTAINING SHIMMY DAMPER SYSTEM FOR LANDING GEAR SHOCK STRUT ASSEMBLIES

CROSS-REFERENCE TO RELATED APPLICATIONS

This application is a non-provisional of, and claims priority to, and the benefit of India Provisional Application No. 202141058202 with DAS Code 2D9E, entitled "SELF-SUSTAINING SHIMMY DAMPER SYSTEM FOR LANDING GEAR SHOCK STRUT ASSEMBLIES," filed on Dec. 14, 2021, which is hereby incorporated by reference in its entirety.

FIELD

The present disclosure relates to landing gear shock strut assemblies, and more specifically to shock strut assemblies having self-sustaining shimmy damper systems.

BACKGROUND

In aircraft landing gear systems, the phenomenon of wheel shimmy is a condition in which an aircraft wheel or wheels oscillate from side to side perpendicular to the direction of travel of the aircraft and/or rotates back and forth about the landing gear strut centerline, hence causing vibration. Shimmy damper systems are also used in aircraft landing gears for reducing these undesirable oscillations of the landing gear. These may also occur due to unbalanced or uncentered wheels, unequal pressure in the tires or uneven tires etc. Aircraft landing gear assemblies generally include shock absorbing struts. These shock struts typically include a shock strut piston and a shock strut cylinder. Torque links are installed between the shock strut cylinder and the shock strut piston to restrain rotation of the axle (with the piston). The shimmy damper systems are generally incorporated as part of the torque links to increase landing gear stability and decreasing the chances of landing gear shimmy.

SUMMARY

A shimmy damper assembly is disclosed herein. The shimmy damper assembly may comprise: a damper piston including a piston head, the piston head comprising a first permanent magnet, a shimmy cylinder including a second permanent magnet disposed on an axial surface of the shimmy cylinder, and a gland nut coupled to the shimmy cylinder, the gland nut including a third permanent magnet spaced apart axially from the second permanent magnet, the piston head disposed between the first permanent magnet and the second permanent magnet.

In various embodiments, the shimmy damper assembly further comprises a magnetorheological (MR) fluid disposed in a cavity of a shimmy cylinder assembly, the shimmy cylinder assembly including the shimmy cylinder and the gland nut.

In various embodiments, the shimmy damper assembly may further comprise a cavity of a shimmy cylinder assembly, the shimmy cylinder assembly including the shimmy cylinder and the gland nut, wherein the cavity is defined radially between a radially outer surface of the damper piston and a radially inner surface of the shimmy cylinder and the gland nut. The cavity may be defined axially between the second permanent magnet and the third permanent magnet.

In various embodiments, the first permanent magnet, the second permanent magnet, and the third permanent magnet may be oriented in a manner to form a Halbach array.

In various embodiments, the first permanent magnet, the second permanent magnet, and the third permanent magnet each comprise a first pole and a second pole, and wherein the first permanent magnet comprises the second pole spaced apart axially proximate the second pole of the second permanent magnet. The first pole of the first permanent magnet may be disposed on a first axial surface of the piston head and the second pole of the first permanent magnet is disposed on a second axial surface of the piston head, the first axial surface disposed axially opposite the second axial surface.

In various embodiments, the shimmy damper assembly further comprises an orifice disposed axially through the piston head.

In various embodiments, the shimmy damper assembly further comprises an annular orifice defined between a radially outer surface of the piston head and a radially inner surface of the gland nut and the shimmy cylinder.

A landing gear is disclosed herein. The landing gear may comprise: an axle configured to support a tire; and a shock strut assembly coupled to the axle, the shock strut assembly including: a strut cylinder; a strut piston configured to telescope relative to the strut cylinder; and a shimmy damper system, comprising: a damper piston having a piston rod and a piston head, the piston head including a first permanent magnet disposed thereon, and a shimmy cylinder assembly at least partially defining a cavity, the shimmy cylinder assembly having a second permanent magnet and a third permanent magnet disposed within the cavity. The permanent magnets may be oriented in a manner to form a Halbach array.

In various embodiments, the shimmy damper system further comprises a magnetorheological (MR) fluid disposed in the cavity of the shimmy cylinder assembly.

In various embodiments, the piston head comprises an orifice disposed axially through the piston head.

In various embodiments, the shimmy damper system further comprises an annular orifice defined between a radially outer surface of the piston head and a radially inner surface of the shimmy cylinder assembly.

In various embodiments, the piston head is configured to self-center within the cavity in response to traveling axially towards one of the second permanent magnet and the third permanent magnet.

In various embodiments, the shimmy damper system is configured to passively dampen the damper piston.

In various embodiments, the shimmy damper system further comprises a torque link coupled to the shimmy cylinder assembly. The shimmy damper system may further comprise second torque link spaced apart axially from the torque link.

A method of manufacturing a shimmy damper system is disclosed herein. The method may comprise: installing a permanent magnet on a piston head of a piston; installing a second permanent magnet on a shimmy cylinder of a shimmy cylinder assembly; installing a third permanent magnet on a gland nut of the shimmy cylinder assembly; and operably coupling the shimmy cylinder assembly to the piston, the shimmy cylinder assembly at least partially defining a cavity therein, the piston head disposed within the cavity.

In various embodiments, the method may further comprise filling the cavity with a magnetorheological (MR)

fluid. The method may further comprise sealing the cavity from an external environment.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Disclosed herein is a shimmy damper assembly for an aircraft landing gear. In accordance with various embodiments, the shock strut assembly includes a damper system operably coupled between the strut piston and the strut cylinder of the shock strut assembly. The damper system is configured to limit or eliminate shimmy during a landing event. "Shimmy," as referred to herein includes side to side oscillations perpendicular to a direction of travel for an aircraft of the landing gear due to structural vibrations and/or tire forces. Shimmy may reduce a stability of the landing gear over time and cause additional fatigue to a landing gear structure. In accordance with various embodiments, the damper system includes various permanent magnets and a magneto rheological fluid. In this regard, the damper system disclosed herein is a passive damper system for reducing and/or eliminating shimmy, in accordance with various embodiments.

Figure 1:
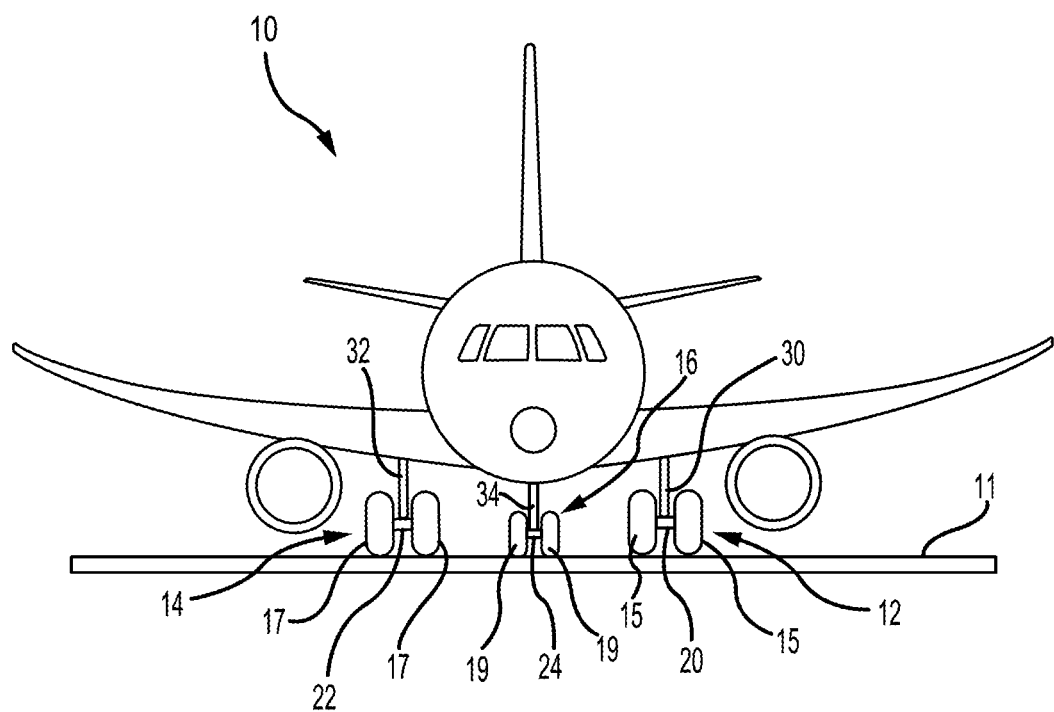
FIG. 1 illustrates an aircraft, in accordance with various embodiments.

With reference to FIG. 1, an aircraft 10 is illustrated. In accordance with various embodiments, aircraft 10 may include landing gear such as left (or first) landing gear 12, right (or second) landing gear 14, and nose (or third) landing gear 16. Left landing gear 12, right landing gear 14, and nose landing gear 16 may generally support aircraft 10 when aircraft 10 is not flying, allowing aircraft 10 to taxi, take off, and land without damage. Left landing gear 12 may include a shock strut assembly 30 and a pair of wheels 15 coupled by an axle 20. Right landing gear 14 may include a shock strut assembly 32 and a pair of wheels 17 coupled by an axle 22. Nose landing gear 16 may include a shock strut assembly 34 and a pair of nose wheels 19 coupled by an axle 24. In various embodiments, nose wheels 19 may differ from main wheels 15 and main wheel 17 in that the nose wheels 19 may not include a brake. While left landing gear 12, right landing gear 14, and nose landing gear 16 are illustrated as each having two wheels, it should be understood that the shock strut assemblies described herein may be used with landing gear having any number and/or configuration of wheels.

When supporting aircraft 10 on ground surface 11, the weight of aircraft 10 may cause shock strut assemblies 30, 32, and/or 34 to compress. In this regard, during landing and taxiing of aircraft 10, the shock strut assemblies compress, thereby decreasing a stroke length of the shock strut assembly and absorbing the kinetic energy of the aircraft.

Figure 2:
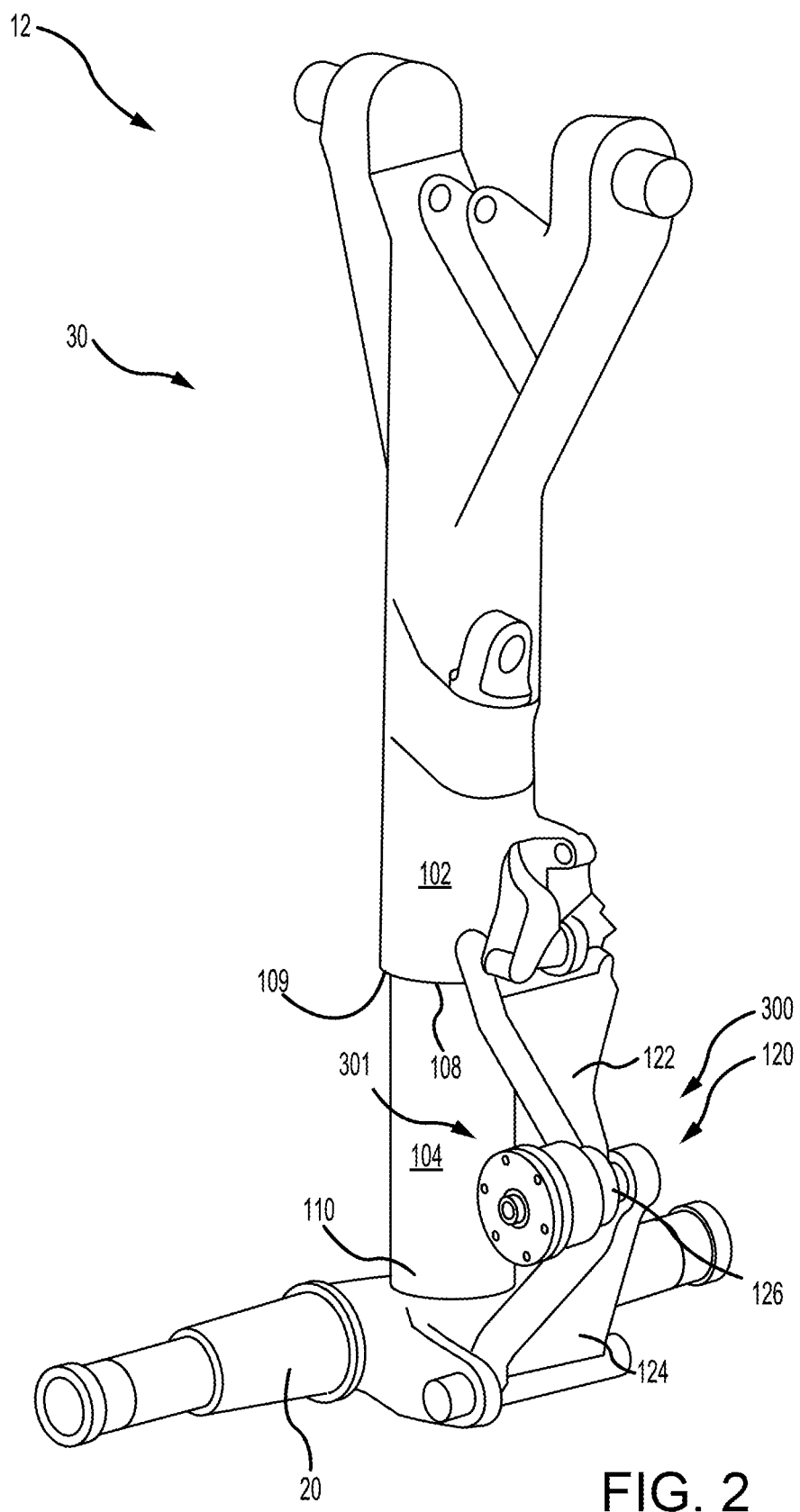
FIG. 2 illustrates a landing gear with the shock strut assembly, in accordance with various embodiments.

With reference to FIG. 2, a perspective view of left landing gear 12 is illustrated with shock strut assembly 30, in accordance with various embodiments. Shock strut assembly 30 may include a strut cylinder 102 and a strut piston 104. Axle 20 is coupled to an end 110 of strut piston 104 that is opposite strut cylinder 102. Strut piston 104 is telescopically coupled to strut cylinder 102. In this regard, strut piston 104 is configured to telescope relative to strut cylinder 102, thereby causing shock strut assembly 30 to absorb and damp loads imposed on left landing gear 12. Stated differently, strut piston 104 translates in and out strut cylinder 102. In various embodiments, fluid including hydraulic fluid, oil, and/or gas, such as nitrogen, may be located within an internal cavity of strut cylinder 102. The internal cavity of strut cylinder 102 may consist of a single cavity or separate cavities containing one or more different fluids within the cavities. Strut piston 104 translating relative to strut cylinder 102 may change the internal cavity pressure of strut cylinder 102 and/or may cause fluid to flow in and out shock strut assembly 30.

Strut piston 104 extends from strut cylinder 102 by a length. In accordance with various embodiments, as shock strut assembly 30 compresses (i.e., as strut piston 104 translates into strut cylinder 102), the length decreases. Conversely, as shock strut assembly 30 decompresses (i.e., as strut piston 104 translates out strut cylinder 102), the length increases. In various embodiments, the length corresponds to a distance between axle 20 and a lower surface 108 of strut cylinder 102. Lower surface 108 of strut cylinder 102 defines a piston opening 109, in strut cylinder 102, through which strut piston 104 translates.

In various embodiments, shock strut assembly 30 may include a torque link 120 coupled to the strut cylinder 102 and strut piston 104. Torque link 120 provides torsion stiffness for left landing gear 12 and decreases rotation of strut piston 104 relative to strut cylinder 102. In various embodiments, torque link 120 may be coupled to the strut cylinder 102 and axle 20. Torque link 120 includes an upper (or first) arm 122 and a lower (or second) arm 124. Upper arm 122 may be coupled to strut cylinder 102. Lower arm 124 may be coupled to strut piston 104 and/or to axle 20. Upper arm 122 is pivotably coupled to lower arm 124 via a damper piston 126 (e.g., an apex pin). Upper arm 122 and lower arm 124 may pivot relative to one another and about damper piston 126. For example, upper arm 122 and lower arm 124 may pivot relative to one another and about damper piston 126 in response to translation of strut piston in and out strut cylinder 102. Stated differently, pivot joint 126 is configured to allow upper arm 122 and lower arm 124 to rotate relative to one as strut piston 104 telescopes relative to (i.e., translates in and out) strut cylinder 102. In various embodiments, shock strut assembly 30 may be part of an articulated landing gear. In this regard, a torque link, similar to torque link 120, may be pivotably coupled between shock strut assembly 30 (e.g., strut cylinder 102) and aircraft 10 (with momentary reference to FIG. 1).

In various embodiments, a shimmy damper system 301 is integrated within the torque link 120. In this regard, a shimmy damper assembly 300 may be located at the pivot joint of the upper arm 122 and the lower arm 124 as described further herein. In this regard, the shimmy damper assembly 300 is configured to reduce horizontal rotation or "shimmy" of axle 20. As used herein, "horizontal rotation" of axle 20 refers to rotation of axle 20 about an axis that is perpendicular to the axis of rotation of wheels 15 and parallel to the direction that strut piston 104 telescopes.

Figure 3:
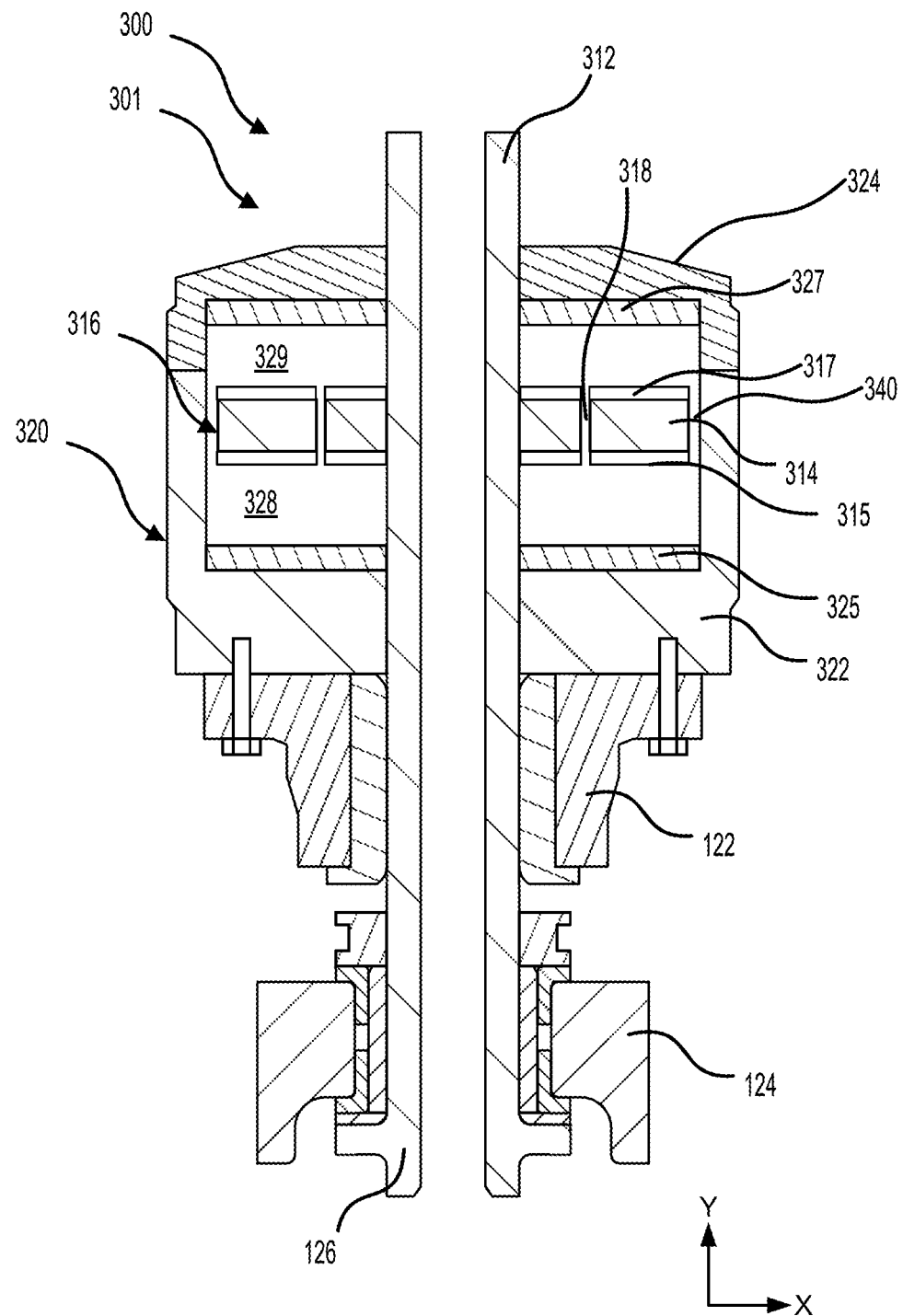
FIG. 3 illustrates a cross-sectional view of a shimmy damper assembly, in accordance with various embodiments.

Referring now to FIG. 3, a cross sectional view of a portion of the shimmy damper assembly 300 with the shimmy damper system 301 is illustrated, in accordance with various embodiments. In various embodiments, shimmy damper assembly 300 comprises a damper piston 126 and a shimmy cylinder assembly 320. The damper piston 126 comprises a piston rod 312 and a piston head 314.

In various embodiments, the piston head 314 comprises a first permanent magnet 316 of the shimmy damper system 301. The permanent magnet comprises a north seeking ("N") pole 317 and a south seeking ("S") pole 315. In various embodiments, the first permanent magnet 316 may be coupled to the piston head 314 or be integral with the piston head 314. The present disclosure is not limited in this regard. For example, the piston head 314 may be magnetized to form the N pole 317 and the S pole 315, in accordance with various embodiments.

In various embodiments, the shimmy cylinder assembly 320 comprises a shimmy cylinder 322 and a gland nut 324. The shimmy cylinder 322 is configured to be coupled to the gland nut 324 to form a cavity 328 therein. The shimmy cylinder assembly 320 further comprises a second permanent magnet 325 and a third permanent magnet 327. The second permanent magnet 325 may comprise an S pole at least partially defining a cavity 328. The third permanent magnet 327 may comprise an N pole at least partially defining the cavity 328. In various embodiments, the third permanent magnet 327 may be coupled to the gland nut 324 and the second permanent magnet 325 may be coupled to the shimmy cylinder 322. In various embodiments, the third permanent magnet 327 may be integral with the gland nut 324 and the second permanent magnet 325 may be coupled to the shimmy cylinder 322. For example, an axial surface of the gland nut 324 and an axial surface of the shimmy cylinder 322 may be magnetized to form opposing permanent magnets 325, 327.

In various embodiments, the third permanent magnet 327 is spaced apart axially from the N pole 317 of the first permanent magnet 316, which is spaced apart axially from the S pole 315 of the first permanent magnet 316, which is spaced apart axially from the second permanent magnet 325. Although described as having the N Pole of the third permanent magnet 327 disposed on the gland nut 324 and the S pole of the second permanent magnet 325 disposed on the shimmy cylinder 322, the present disclosure is not limited in this regard. For example, the N Pole of the third permanent magnet 327 may be oriented into the cavity 328 and the S pole of the second permanent magnet 325 may oriented into the cavity 328 as long as the N pole 317 of the first permanent magnet 316 is disposed between the N pole of the third permanent magnet 327 and the S pole 315 and the S pole 315 is disposed between the S pole of the second permanent magnet 325 and the N pole 317. In this regard, the permanent magnets 316, 325, 327 may be oriented in a manner to form a Halbach array.

The cavity 328 is defined axially (i.e., along an axis of a centerline of the shimmy cylinder 322 or the Y-direction) between the N pole of the third permanent magnet 327 and the S pole of the second permanent magnet 325. The cavity 328 is defined radially between a radially outer surface of the piston rod 312 and a radially inner surface of the shimmy cylinder 322 and the gland nut 324.

In various embodiments, a magnetorheological (MR) fluid 329 is disposed within the cavity 328. The MR fluid 329 is a "smart fluid" that, when subjected to a magnet field, increases in apparent viscosity. In this regard, the closer the N pole 317 off the first permanent magnet 316 and the N pole of the third permanent magnet 327 become, the greater the viscosity of the MR fluid 329. Similarly, the closer the S pole 315 of the first permanent magnet 316 and the S pole of the second permanent magnet 325 become, the greater the viscosity of the MR fluid 329. Thus, the shimmy damper system 301 provides a variable damping within the shimmy damper system 301.

In various embodiments, the piston head 314 further comprises an orifice 318 disposed axially therethrough. In various embodiments, the piston head 314 may comprise a plurality of the orifice 318 disposed circumferentially about the piston head 314. Any number of orifices 318 are within the scope of this disclosure. For example, the piston head may comprise two of the orifice 318, four of the orifice 318, eight of the orifice 318, or the like. In various embodiments, an annular orifice 340 may be defined between a radially outer surface of piston head 314 and a radially inner surface of the shimmy cylinder 322 and the gland nut 324. In this regard, as the piston head travels axially towards either the S pole of the second permanent magnet 325 or the N pole of the third permanent magnet 327, the viscosity of the MR fluid 329 increases, the MR fluid travels through the orifice 318 and/or the annular orifice 340, thus resisting movement of the damper piston 126 and damping the damper piston 126, in accordance with various embodiments.

In various embodiments, the piston head 314 may comprise a cap disposed thereon. In this regard, the cap may prevent contact between the MR fluid 329 and the piston head 314.

In various embodiments, the shimmy damper assembly 300 further comprises an upper arm 122 and a lower arm 124. The upper arm 122 is spaced apart axially (i.e., in the Y-direction) from the lower arm 124. Thus, a gap between the upper arm 122 and the lower arm 124 provided at an apex joint facilitates operation of the shimmy damper system 301, in accordance with various embodiments.

In various embodiments, the shimmy damper system 301 is further configured to provide self-centering of the piston head 314. For example, when piston head 314 travels towards the N pole of the third permanent magnet 327, the piston head 314 is repelled by an opposing force back towards a neutral position. Similarly, in response to the piston head 314 traveling towards the S pole of the second permanent magnet 325, the piston head 314 is repelled by an opposing force back towards the neutral position. Thus, springs and/or washers may be removed from the shimmy damper system 301, in accordance with various embodiments.

In various embodiments, a dynamic seal may be disposed radially between a radially inner surface of the gland nut 324 and a radially outer surface of the piston rod 312 and axially along the radially inner surface of the gland nut 324. Similarly, a dynamic seal may be disposed radially between a radially inner surface of the shimmy cylinder 322 and the radially outer surface of the piston rod 312 and axially along the radially inner surface of the shimmy cylinder 322. In this regard, the piston rod 312 may travel axially relative to the shimmy cylinder assembly 320 and maintain fluid isolation between the MR fluid 329 and an external environment.

Figure 4:
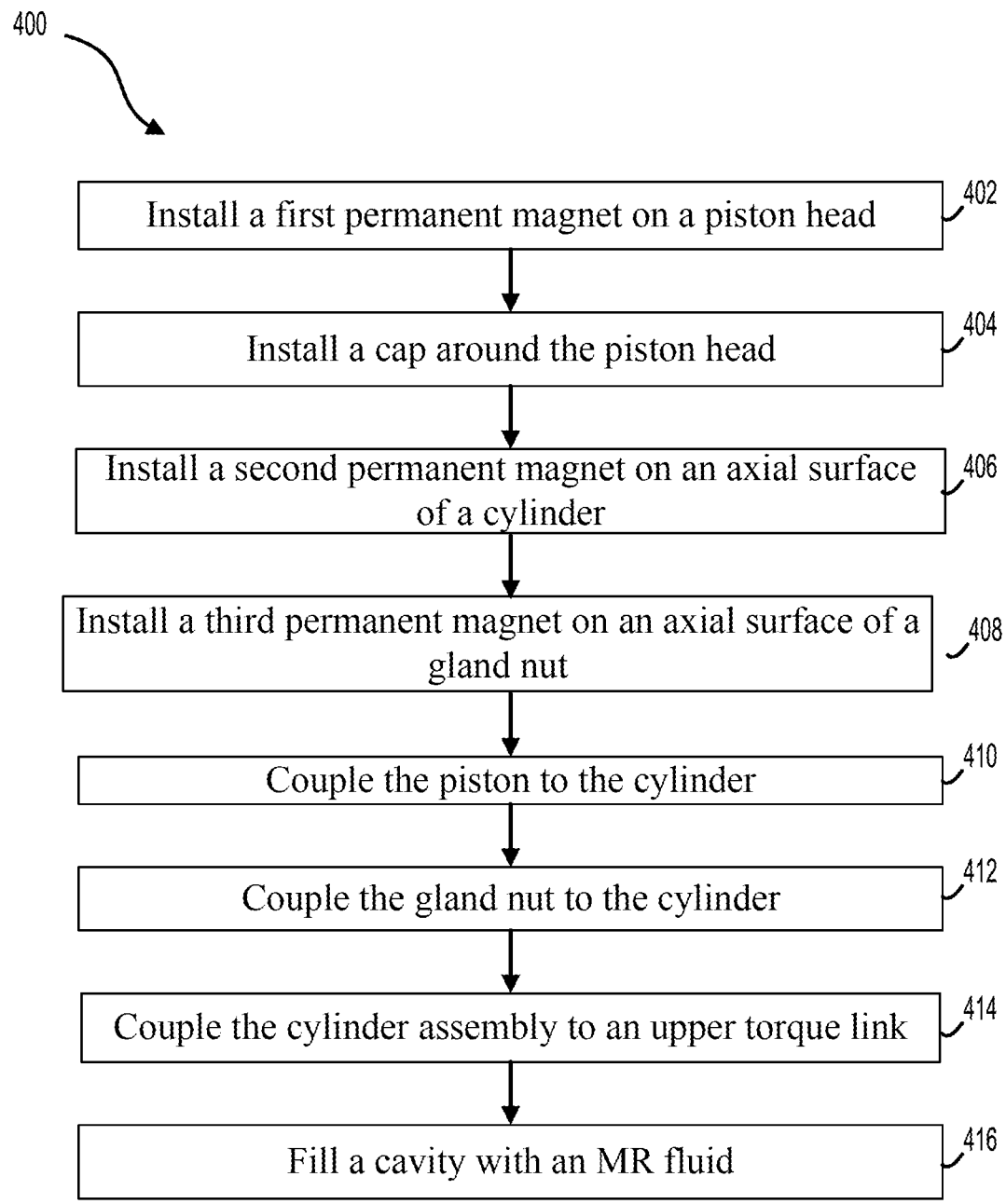
FIG. 4 illustrates a method of manufacturing a shimmy damper assembly, in accordance with various embodiments.

Referring now to FIGS. 3 and 4, a method 400 (FIG. 4) of manufacturing a shimmy damper system 301 for a shimmy damper assembly 300 from FIG. 3 is illustrated, in accordance with various embodiments. The method 400 comprises installing a first permanent magnet 316 on a piston head 314 (step 402). The first permanent magnet 316 may be coupled to the piston head 314 or the piston head 314 may be magnetized, in accordance with various embodiments.

The method 400 may further comprise installing a cap around the piston head 314 to fluidly isolate the piston head 314 from an MR fluid (step 404). The method 400 further comprises installing a second permanent magnet (e.g., second permanent magnet 325) on an axial surface of a shimmy cylinder 322 (step 406). The method 400 further comprises installing a third permanent magnet (e.g., third permanent magnet 327) on an axial surface of a gland nut 324 (step 408). The permanent magnets may be oriented in a manner to form a Halbach array as described previously herein.

The method 400 further comprises coupling a damper piston 126 including the piston head 314 and a piston rod 312 to the shimmy cylinder 322 (step 410). The method 400 further comprises coupling the gland nut 324 to the shimmy cylinder 322 to form a cavity 328 therein (step 412). The method 400 further comprises coupling the shimmy cylinder assembly 320 to an upper arm 122 (step 414). The method 400 further comprises filling the cavity 328 with an MR fluid 329. The MR fluid may be disposed through an aperture in the shimmy cylinder assembly 320 that is sealed after filling the cavity 328, in accordance with various embodiments.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shimmy damper assembly, comprising:
a damper piston including a piston head, the piston head comprising a first permanent magnet, the piston head comprising an orifice disposed axially therethrough;
a shimmy cylinder assembly comprising a shimmy cylinder and a gland nut, the shimmy cylinder including a second permanent magnet disposed on an axial surface of the shimmy cylinder, the gland nut coupled to the shimmy cylinder, the gland nut including a third permanent magnet spaced apart axially from the second permanent magnet, the piston head disposed between the first permanent magnet and the second permanent magnet; and
a magnetorheological (MR) fluid disposed in a cavity of the shimmy cylinder assembly, the shimmy cylinder assembly including the shimmy cylinder and the gland nut, wherein:
the cavity is defined radially between a radially outer surface of the damper piston and a radially inner surface of the shimmy cylinder and the gland nut,
the cavity is defined axially between the second permanent magnet and the third permanent magnet,
the MR fluid is only disposed in the cavity, the damper piston extends entirely through the shimmy cylinder assembly, an annular orifice is defined between the radially outer surface of the piston head and the radially inner surface of the gland nut and the shimmy cylinder, the first permanent magnet, the second permanent magnet, and the third permanent magnet each comprise a first pole and a second pole, and wherein the first permanent magnet comprises the second pole spaced apart axially proximate the second pole of the second permanent magnet, and the first pole of the first permanent magnet is disposed on a first axial surface of the piston head and the second pole of the first permanent magnet is disposed on a second axial surface of the piston head, the first axial surface disposed axially opposite the second axial surface.

2. The shimmy damper assembly of claim 1, wherein the first permanent magnet, the second permanent magnet, and the third permanent magnet are oriented in a manner to form a Halbach array.

3. The shimmy damper assembly of claim 1, wherein:
the first pole is one of a north seeking ("N") pole and a south seeking ("S") pole, and
the second pole is the other of the north seeking ("N") pole and the south seeking ("S") pole.

4. A landing gear, comprising:
an axle configured to support a tire;
a shock strut assembly coupled to the axle, the shock strut assembly including:
a strut cylinder;
a strut piston configured to telescope relative to the strut cylinder;
a shimmy damper assembly configured to reduce horizontal rotation of the axle during operation of the landing gear, the shimmy damper assembly comprising:
a damper piston having a piston rod and a piston head, the piston head including a first permanent magnet disposed thereon, wherein the piston head comprises an orifice disposed axially therethrough,
a shimmy cylinder assembly comprising a shimmy cylinder and a gland nut, the shimmy cylinder assembly at least partially defining a cavity, the shimmy cylinder assembly having a second permanent magnet and a third permanent magnet disposed within the cavity, wherein the first permanent magnet, the second permanent magnet and the third permanent magnet are oriented in a manner to form a Halbach array within the cavity,
a magnetorheological (MR) fluid disposed in the cavity of the shimmy cylinder assembly, wherein:
the cavity is defined radially between a radially outer surface of the damper piston and a radially inner surface of the shimmy cylinder and the gland nut,
the cavity is defined axially between the second permanent magnet and the third permanent magnet,
the MR fluid is only disposed in the cavity,
an annular orifice is defined between the radially outer surface of the piston head and the radially inner surface of the gland nut and the shimmy cylinder,
the first permanent magnet, the second permanent magnet, and the third permanent magnet each comprise a first pole and a second pole, and wherein the first permanent magnet comprises the second pole spaced apart axially proximate the second pole of the second permanent magnet, and the first pole of the first permanent magnet is disposed on a first axial surface of the piston head and the second pole of the first permanent magnet is disposed on a second axial surface of the piston head, the first axial surface disposed axially opposite the second axial surface; and a torque link including an upper arm and a lower arm, the upper arm coupled to the strut cylinder, the lower arm coupled to at least one of the strut piston and the axle, the upper arm pivotably coupled to the lower arm via the damper piston of the shimmy damper assembly.

5. The landing gear of claim 4, wherein the piston head is configured to self-center within the cavity in response to traveling axially towards one of the second permanent magnet and the third permanent magnet.

6. The landing gear of claim 4, wherein the shimmy damper assembly is configured to passively dampen the damper piston.

7. A method of manufacturing a shimmy damper system, the method comprising:
installing a first permanent magnet on a piston head of a piston;
installing a second permanent magnet on an axial surface of a shimmy cylinder of a shimmy cylinder assembly;
installing a third permanent magnet on an axial surface of a gland nut of the shimmy cylinder assembly;
coupling the gland nut to the shimmy cylinder to form the shimmy cylinder assembly and to operably couple the shimmy cylinder assembly the piston, the shimmy cylinder assembly at least partially defining a cavity therein, the cavity defined axially between the axial surface of the shimmy cylinder and the axial surface of the gland nut, the piston head disposed within the cavity, the piston head comprising an orifice disposed axially therethrough, the piston extending entirely through the shimmy cylinder assembly, wherein:
the cavity is defined radially between a radially outer surface of the piston and a radially inner surface of the shimmy cylinder and the gland nut,
the cavity is defined axially between the second permanent magnet and the third permanent magnet,
an annular orifice is defined between the radially outer surface of the piston head and the radially inner surface of the gland nut and the shimmy cylinder,
the first permanent magnet, the second permanent magnet, and the third permanent magnet each comprise a first pole and a second pole, and wherein the first permanent magnet comprises the second pole spaced apart axially proximate the second pole of the second permanent magnet, and
the first pole of the first permanent magnet is disposed on a first axial surface of the piston head and the second pole of the first permanent magnet is disposed on a second axial surface of the piston head, the first axial surface disposed axially opposite the second axial surface;
filling only the cavity with a magnetorheological (MR) fluid; and
sealing the cavity from an external environment.

* * * * *